July 12, 1960     F. R. BERG     2,945,209
VEHICLE AUTOMATIC STOP LIGHT
Filed June 4, 1958
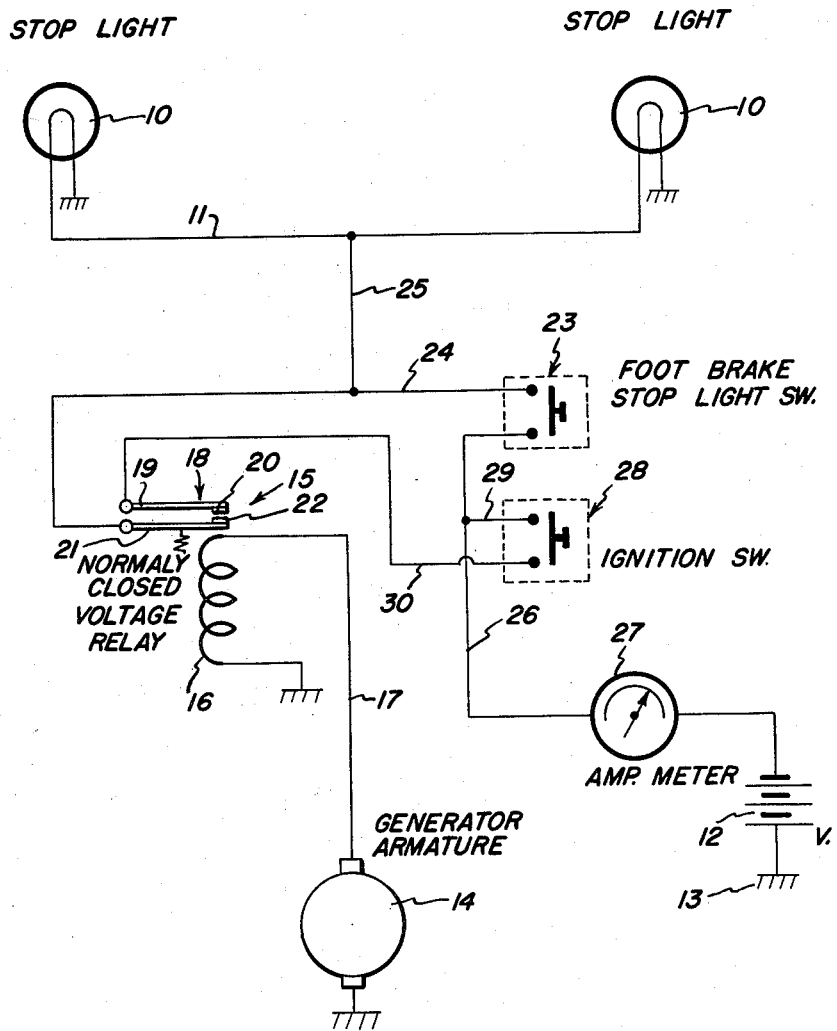
INVENTOR.
FRANK R. BERG
ATTORNEYS

United States Patent Office 2,945,209
Patented July 12, 1960

2,945,209

VEHICLE AUTOMATIC STOP LIGHT

Frank R. Berg, 140 Franklin St., Vallejo, Calif.

Filed June 4, 1958, Ser. No. 739,801

1 Claim. (Cl. 340—71)

This invention relates to a vehicle, and more particularly to an automatic stop light for a vehicle.

The object of the invention is to provide a means for permitting the stop lights of a vehicle to be actuated without the necessity of applying foot pressure to the foot brake of the vehicle.

Another object of the invention is to provide an arrangement whereby the vehicle stop lights can be caused to remain on even when there is no foot pressure on the foot brake, so that the present invention provides a means for permitting the stop lights to be actuated or energized when the vehicle is stopped or parked alongside a road, so that with the stop lights on the vehicle can remain parked or stationary with greater safety since there will be less likelihood of approaching vehicles accidentally crashing into the parked or stopped vehicle since the stop lights can be observed or seen from a considerable distance.

A further object of the invention is to provide a vehicle automatic stop light assembly which is extremely simple and inexpensive to manufacture.

Other objects and advantages will be apparent during the course of the following description.

In the accompanying drawing, forming a part of this application, and in which like numerals are used to designate like parts throughout the same, The single figure is a view illustrating schematically the wiring diagram of the present invention.

Referring in detail to the drawing, the numeral 10 indicates each of the usual stop lights which are electrically connected together by means of the wire or conductor 11. The numeral 12 indicates the usual source of electrical energy such as the vehicle battery which is grounded as at 13, and the numeral 14 indicates a generator armature.

There is further provided an automatic switch which is indicated generally by the numeral 15, and the switch 15 includes a voltage coil 16 which is connected to the generator armature 14 by means of a wire 17. The numeral 18 indicates a normally closed relay, and the relay 18 includes a stationary bar 19 that is provided with a terminal 20. The numeral 21 indicates a movable arm which is provided with a contact 22, and the contact 22 is mounted for movement into and out of engagement with the terminal 20.

The numeral 23 indicates the usual foot brake stop light switch of a vehicle, and the stop light switch 23 has one side thereof connected to the movable arm 21 by means of a wire 24. The numeral 25 indicates a wire which extends between the wires 11 and 24. The foot brake stop light switch 23 is further connected to the vehicle battery 12 by means of a conductor 26, and the numeral 27 indicates an ammeter which is arranged in the line or conductor 26 as shown in the drawings.

The vehicle is further provided with an ignition switch which is indicated generally by the numeral 28, and the ignition switch 28 has a wire 29 electrically connected to the conductor 26. The numeral 30 indicates a wire which leads from the ignition switch 28 to the stationary bar 19 of the relay 15.

From the foregoing, it is apparent that there has been provided a means for permitting the stop lights of a vehicle to remain on even though no foot pressure is applied to the foot brake stop light switch. In use, with the parts hooked up or arranged as shown in the drawing, it will be seen that when the ignition switch 28 is turned on, electrical energy will flow from the battery 12 through the conductor 26 and then through the line 29, and then through the switch 28, and then through the wire or line 30 to the normally closed relay 15, and this electrical energy can then pass through a portion of the wire 24 and through the wire 25 and then through the wire 11 to actuate or energize the pair of stop lights 10. Thus, for example when a vehicle is parked or stopped for repairs, or for any other reason, by turning on the ignition switch 28, the stop lights 10 will be energized so that approaching vehicles will be able to readily see the parked vehicle from a considerable distance so that there will be less likelihood of accidents, collisions or the like.

It is to be noted that after the vehicle has been started, when the generator armature 14 builds up sufficient energy to actuate the coil 16, the movable arm 21 of the relay 15 will be pulled or moved away from the stationary bar 19 so that the contact 22 will move away from the terminal 20 so as to open the normally closed relay 15. With the relay 15 open, it will be seen that even though the ignition switch 28 is on, the electrical circuit from the ignition switch 28 to the stop lights 10 will be interrupted since the switch 15 will be open so that stop lights 10 will not be on when the generator armature 14 is operating at a sufficiently high rate. However, with the relay 15 open, it will be seen that when the operator or driver of the vehicle steps on the foot brake stop light switch 23, the circuit from the battery 12 to the stop lights 10 through the wires 11, 25, 24 and 26 will be completed so that by stepping on the switch 23, the electrical circuit to the stop lights 10 will be completed so that the stop lights 10 will be energized in the usual manner.

The parts can be made of any suitable material and the present invention can be used on different types of vehicles.

It will be seen that according to the drawing, the foot brake switch 23 can operate the stop lights 10 with the ignition switch turned off. Also, the ignition switch 28 will turn off the stop lights when the switch 28 is in off position.

The operation of the voltage relay is as follows. The wire 17 which runs from the main brush of the generator, is always in direct contact with the voltage coil 16. When the generator speed is increased, and the generator voltage comes up high enough to build up a sufficient voltage, it magnetizes the coil core in the relay and this magnetic pull draws the relay arm 21 towards the coil core against the pressure of a spring. This action separates the relay points 20 and 22 and the stop lights 10 will go out. When the generator speed is reduced to idling speed, the voltage produced by the generator is reduced and the relay arm 21 is pulled away from the relay core by spring pressure so that the points 20 and 22 make contact which in turn cause the stop lights 10 to light up. The voltage relay functions as an automatic switch that is constructed to operate after voltage is produced by the generator.

The automatic stop light assembly of the present invention does not interfere with the operation of the stop light systems now provided on automobiles, trucks or the like.

Heretofore vehicles such as automobiles, trucks, trailers and the like have not been equipped with an automatic device to operate and light up the stop lights when the vehicle is in a stopped or parked position and the only time that the stop lights have been energized or turned on is when the foot brake is applied to stop or slow down the vehicle. Usually a vehicle stopped or stalled on a highway does not have its stop lights on and by means of the present invention the stop lights will be automatically turned on when the ignition switch is on so as to warn other traffic that the vehicle is not in motion. The automatic stop light assembly of the present invention will operate and turn on the vehicle stop lights independently of the foot brake when the vehicle is in the stopped or parked position and the ignition switch is turned on.

It is to be noted that according to the present invention, a normally closed direct current voltage relay has its coil 16 connected to the generator main brush or armature circuit so that the voltage delivered by the generator at slow speed, or when the engine is idling, will be low enough to actuate the relay armature or member 21 so that the stop lights 10 can be selectively turned on or off. As the engine is speeded up, and the vehicle is in motion, the generator also speeds up so as to produce a resulting increase in voltage, and this increase in voltage will actuate the relay so that the points 20 and 22 will open and the stop lights 10 will go off.

In some vehicles, a cut-out relay having a voltage and a current coil may need to be used, and in such a case the voltage coil will be connected to the generator main brush or armature circuit, and the current coil to the generator and battery so that when the vehicle engine is idling the current through the current coil will reverse so as to cause the flux in the current coil to oppose the flux or magnetism in the voltage coil and the relay will drop out closing the relay contacts. This will light the stop lights. When the engine is speeded up or the vehicle is in motion, the current in the relay current coil now aids the voltage coil and the relay contacts open so as to cause the stop lights to go out.

Minor changes in shape, size and rearrangement of details coming within the field of invention claimed may be resorted to in actual practice, if desired.

I claim:

In an electrical system for the stop lights of an automobile, a pair of stop lights electrically connected together, a source of electrical energy, and a generator armature, an automatic switch including a voltage coil connected to said generator armature, said switch further including a normally closed relay, said relay embodying a stationary bar provided with a terminal, a movable arm provided with a contact mounted for movement into and out of engagement with said terminal, a foot brake stop light switch electrically connected to said arm and also electrically connected to said stop lights and also electrically connected to said source of electrical energy, a conductor connecting said foot brake stop light switch to said source of electrical energy, and an ignition switch connected to said conductor and electrically connected to said bar, said foot brake stop light switch and said ignition switch being connected in parallel to said stop lights providing an open circuit whereby the actuation of either of said switches energizes said stop lights.

References Cited in the file of this patent

UNITED STATES PATENTS

| | | |
|---|---|---|
| 1,956,056 | Bellec et al. | Apr. 24, 1934 |
| 2,678,978 | Reynolds | May 18, 1954 |
| 2,784,348 | Danek | Mar. 5, 1957 |
| 2,788,514 | Schmitt | Apr. 9, 1957 |